United States Patent

[11] 3,572,679

[72] Inventor Gunter Strauff
    Kaarst, Germany
[21] Appl. No. 777,398
[22] Filed Nov. 20, 1968
[45] Patented Mar. 30, 1971
[73] Assignee Langen & Co.
    Dusseldorf, Germany
[32] Priority Dec. 15, 1967
[33] Germany
[31] P 16 30 752.1

[54] HYDRO-PNEUMATIC OLEO STRUT OR SUSPENSION ASSEMBLAGE PROVIDED WITH LEVEL REGULATING MEANS LOCATED WITHIN THE CYLINDER HOUSING
2 Claims, 3 Drawing Figs.

[52] U.S. Cl. .................................................. 267/64
[51] Int. Cl. .................................................. F16f 5/00
[50] Field of Search .................................... 267/34, 64

[56] References Cited
UNITED STATES PATENTS
3,140,084 7/1964 Schmidt ...................... 267/64
3,208,760 9/1965 Lucien et al. ................. 267/64

Primary Examiner—James B. Marbert
Attorney—Holman & Stern

ABSTRACT: A hydropneumatic oleo strut or suspension assemblage adapted to be arranged between a wheel supporting means and a vehicle body in which the cylinder casing has located therein a level regulating means. The level regulating means is defined by a multiple way valve and which valve, dependent upon the relative position of the piston rod and cylinder, establishes in a first regulating position a fluid path between a pressure line or conduit which leads to the piston space and in a second regulating position a fluid path in a line leading between the piston space and a drain line or conduit. In a third regulating position, namely, a neutral position, the multiple way valve blocks the aforesaid fluid paths and a continuously operative spring means serves to move the control piston of the multiple way valve into a position which corresponds to the first regulating position, whereas an extension spring means operative only within a certain stroke range related to the piston or piston rod serves to move the control piston into the second regulating position in opposition to the force of the spring means.

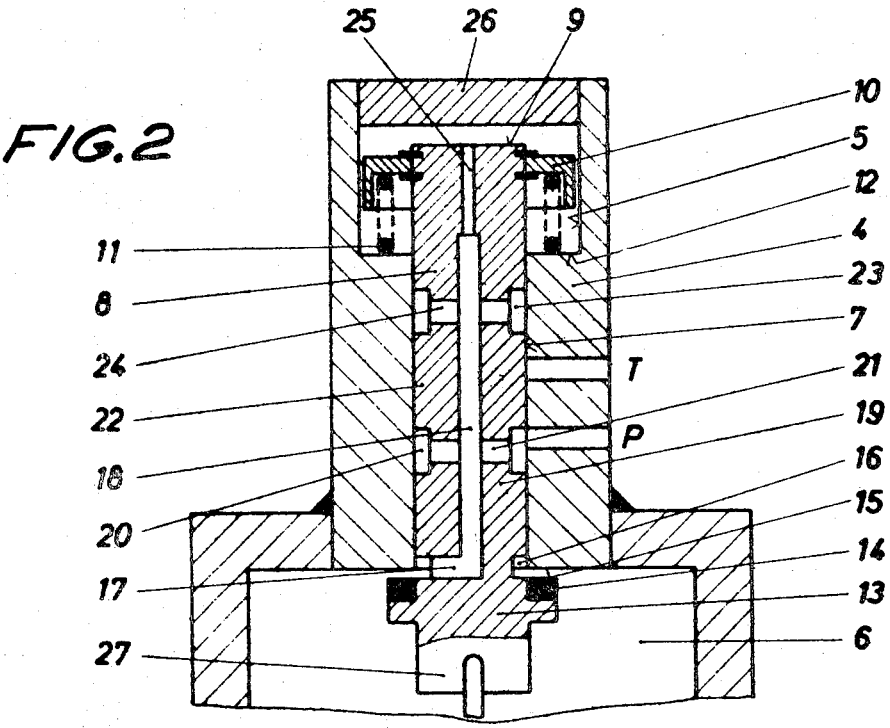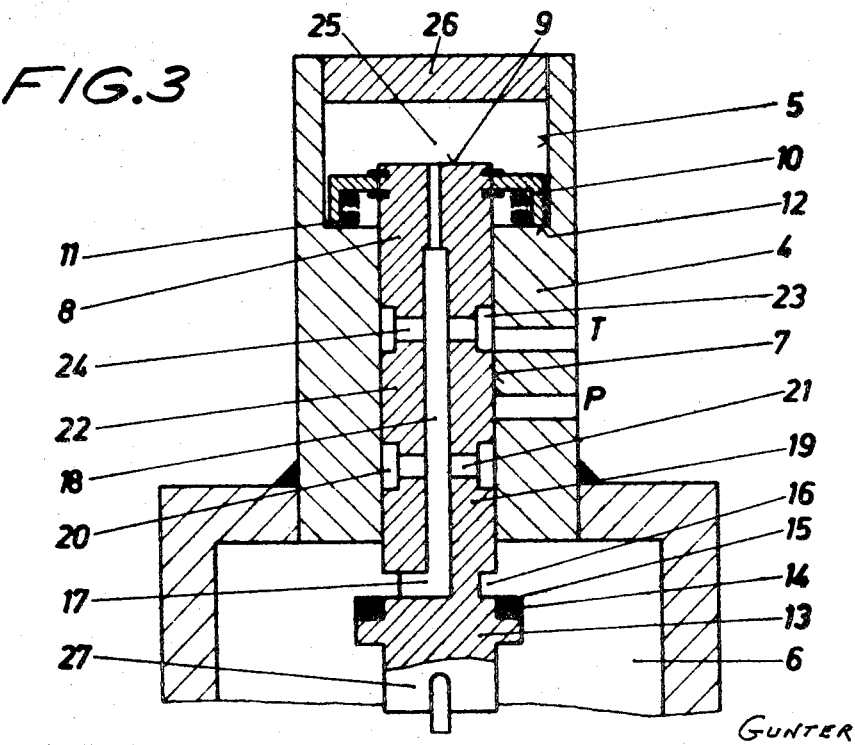

HYDRO-PNEUMATIC OLEO STRUT OR SUSPENSION ASSEMBLAGE PROVIDED WITH LEVEL REGULATING MEANS LOCATED WITHIN THE CYLINDER HOUSING

BACKGROUND OF THE INVENTION

The present invention pertains to a hydropneumatic oleo strut or suspension assemblage for arrangement between a wheel supporting means and a vehicle body for stabilizing the height of the vehicle body.

The advantage of a compact assemblage without external valves, actuating rod arrangements, etcetera, realized by the use of oleo struts of this type as compared with conventional struts equipped with level regulation devices located exteriorly of the cylinder was, until the present time, objectionable in that upon leakage in the pressure line or conduit or upon the failure of the pump, a slow sinking or falling of the vehicle by reason of the leakage liquid flowing past the control piston could not be avoided. This same phenomenon occurred following prolonged periods of the vehicle remaining stationary and it was possible that the piston could retract into the cylinder to its abutment. While this retraction of the piston presents no particular problems or consequences in an operating cylinder such as mounted, for example, between a vehicle body and a leaf spring, except for a loss of height of the vehicle, in a hydropneumatic oleo strut, the spring action is lost when the piston is no longer able to displace liquid into the pressure reservoir. The results thereof are great inconveniences to the occupants of the vehicle, a substantially reduced usefulness of the vehicle, and a shorter life.

SUMMARY OF THE INVENTION

The salient object of the present invention is to prevent the above-mentioned sinking or falling of the vehicle without additional space requirements and expensive auxiliary devices in a reliable and simple fashion. The problem was solved in that from the pressure line a fluid flow path leads to the end of the control piston remote from the piston space and which control piston forms, via a sealing surface, together with a corresponding or complemental portion of the cylinder casing, a sealed seat opening in the direction of the piston space and a flow path leading to the piston space opens into the piston space within such seat.

In a particularly advantageous embodiment of the invention, there is, adjacent to the sealing surface, an annular groove in the control piston which groove is connected via a transverse bore and an axial bore in the control piston with the end of the piston remote from the piston space, at least one additional annular groove being provided for the control piston at a distance from the first-mentioned annular groove which, dependent upon the position of the control piston, is either connected with the pressure line or the drain line or separated from both lines and connected by transverse bores with the axial bore. In order to dampen the control piston movement, the axial bore of the control piston is provided with a throttling point in the vicinity of the end of the piston remote from the piston space and alternatively in another embodiment the diameter of the annular groove corresponding to the drain line may be only slightly smaller or of less cross-sectional area than the diameter of the control piston.

Further objects and advantages of the present invention will become more readily apparent to persons skilled in the art from the following detailed description and annexed drawings and in which drawings:

BRIEF DESCRIPTION OF FIGURES

FIG. 2 is a fragmentary axial cross-sectional view illustrating the position in which fluid is supplied, and FIG. 3 is a fragmentary axial cross-sectional view disclosing the position for the release of fluid.

As illustrated in FIG. 1, a piston 3 provided with a piston rod 2 is slidably disposed in a cylinder 1 having a cylinder head 4. The cylinder head 4 is formed with an axially extending bore 5 which merges with a second axially extending bore of lesser cross-sectional area and the bore 7 opens into a piston space 6 defined between the upper surface of the piston 3 and the lower surface of the piston head 4. A control piston 8 is slidably positioned in the bore 7 and it will be noted that the piston 8 protrudes or extends into both the bore 5 and the piston space 6. In the area of end 9 of the control piston 8 remote from the piston space 6, the piston 8 carries a resilient cup-shaped member 10. A spring 11 is biased between shoulder 12 of the bore 5 and the end of the cup-shaped member 10.

Figure 1:
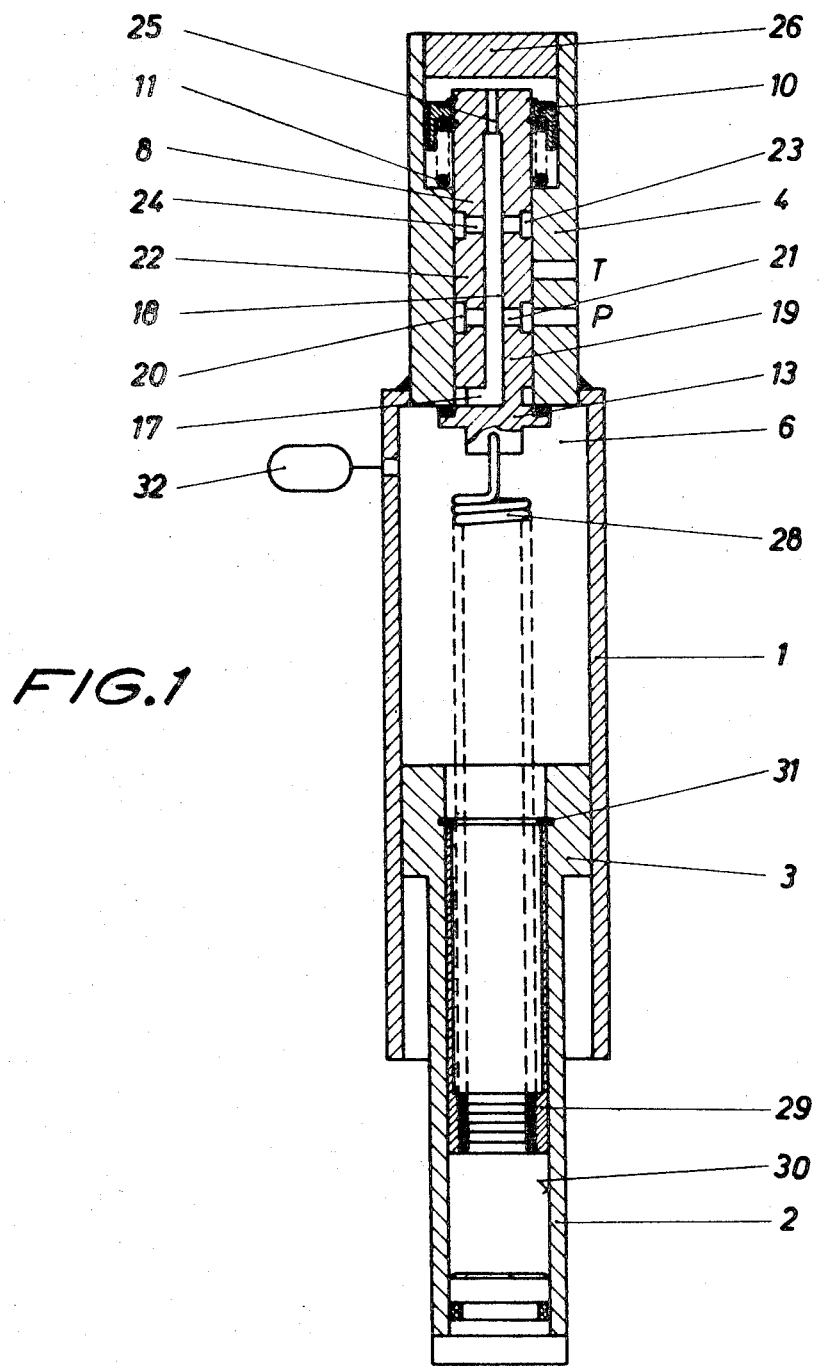
FIG. 1 is a view in axial cross section of a hydropneumatic oleo strut embodying the present invention and with the level regulating means being in the closed position.

At the opposite end of the control piston or that end which extends into the piston space 6, the piston is provided with a collar or flange 13 equipped with a packing 14 thereby providing a sealing surface 15 which coacts with the lower end of the cylinder head 4 to constitute a hermetic seat. The control piston, adjacent to the packing 14, is provided with an annular groove 16 which is connected by a transverse bore 17 with a blind bore 18 which extends axially of the control piston 8 and terminates at the end 9. A second annular groove 20 is separated from the annular groove 16 by a shoulder 19 and the groove 20 communicates with the axial bore 18 via a transverse bore 21. A third annular groove 23 is spaced axially of the groove 20 by a shoulder 22 and the groove 23 is connected with the bore 18 through a transverse bore 24.

A passage P for a pressure line is so arranged in the cylinder head 4 that it terminates in the zone of the groove 20 when its seat is closed. In this position, the shoulder 22 of the control piston 8 closes a passage T leading to a drain line or conduit. Furthermore, the shoulder 22 is so dimensioned that in the neutral position, the shoulder closes both the passage T and the passage P.

Upon still further movement of the control piston 8 and attention is invited to FIG. 3, the annular groove 23 enters the zone of the passage T leading to the drain line and the bore 18 is provided with a throttle area 25. The bore 5 is closed by a cover or plug 26.

It will be noted that the end of the control piston which extends into the piston space 6 and indicated 27 has connected thereto one end of an extension coil spring 28 while the other end of the spring is attached to a sleeve 29. The sleeve 29 slides in a blind bore 30 provided in the piston 3 and piston rod 2 with the upper and lower limits of the stroke of the sleeve being determined by upper and lower stops 31 and 31a respectively. More particularly a portion of the sleeve 29 is threaded and into which the spring 28 is threaded to provide the attachment means for the spring 28.

A hydropneumatic pressure reservoir diagrammatically indicated at 32 is operably connected to the piston space 6.

The operation of the assemblage is as follows:

Assuming that the oleo strut shown in FIG. 1 is installed on a vehicle and that the vehicle is stationary and with no pressure existing in the pressure line connected to the passage P, the packing 14 is positioned hermetically on the corresponding part of the cylinder head 4 and hermetically seals the piston space 6. The sleeve 29 abuts against the stop 31 and when the pressure line leading to the passage P is pressurized, this pressure is applied, via the annular groove 20, the transverse bore 21, the axial bore 18 and the throttle area 25 to the end 9 of the piston 8 whereby the pressure exerted on the end 9 displaces the control piston 8 counter to the pressure existing in the piston space 6 and counter to the action of the spring 11. As a consequence, the sealing surface is displaced from its seat and communication is established between the piston space 6 and the annular groove 16 so that fluid flows from the passage P via the annular groove 20, the transverse bore 21, the bore 18, the transverse bore 17, and the annular groove 16 into the piston space 6. This particular position of the control piston is illustrated in FIG. 2 and due to the seat, the face of the piston 8 loaded from the piston space 6 is somewhat greater than that which is effected on the remote end 9 of the control piston 8. In order to open the control piston 8, the pressure existing in the components P, 16, 17, 18, 20, 21, 23, 24, 25, and 9 must be greater than the pressure prevailing in the piston space 6. Accordingly to this pressure difference and the quantity of fluid flow, the aperture gap adjusts itself and due to the inflowing fluid, the piston 3 is extended thus taking along the sleeve 29 and spring 28 over the stop 31. It should be mentioned that the spring 28 is of greater strength than the spring 11 and a movement of the spring 28 accordingly is transmitted initially to the control piston 8.

The movement of the piston 3, the bushing 29, the spring 28, and the control piston 8 occurs approximately when the shoulder 22 of the piston 8 has almost closed the passage P of the pressure line. The fluid flowing through the ever narrowing gap serves only for the compensation of leakage losses.

When the vehicle is relieved, the fluid flows back from the pressure reservoir 32 into the piston space 6 and effects an additional extension of the piston 3 by way of the sleeve 29 and the spring 28, the control piston is pulled along and assumes a position in which the annular groove 23 communicates with the passage T of the drain line and fluid can flow out of the piston space 6 (FIG. 3). Due to this action, the piston 3 again retracts and the control piston 8 is displaced by virtue of the pressure difference acting thereupon and the force of the spring 11 until the shoulder 22 again closes the passage T of the drain line. Upon a further sinking or dropping the connection between the passage P of the pressure line and the annular groove 20 is again established.

If for example, in this position, the pressure in the passage P of the pressure line drops, the control piston will be displaced for the reasons previously set forth until the sealing surface again effects a hermetic seal. Inasmuch as this closing cycle occurs very rapidly, the piston 3 remains substantially in the same position in which the power failure occurred.

The resilient movements of the piston 3 which are generally much greater than the comparatively small travel paths of the control piston 8 do not act on the control piston to the full extent. Upon elastic contraction, there is no connection whatsoever since the sleeve 29 idles. Upon elastic tension the spring 28 falls or draws the control piston 8 downwardly until the cup-shaped member 10 strikes the shoulder 12 of the bore 5. Greater outward movements of the piston are reflected only in an expansion of the spring 28.

It is of course to be understood that various modifications can be effected under the principles of the present invention. For example, the control piston may have different forms such as a form with only one annular groove which would require the pressure line to be located farther away from the piston space than the drain line. Moreover, the provision of annular grooves in the cylinder casing are possible as well as the connection from the pressure line to piston space being provided in the cylinder casing so long as it terminates within the seating surface. In addition, the seating per se may be metallic and for the damping of the control piston movement and/or for the throttling of the inflowing or outflowing fluid, throttle means may be located in the corresponding lines or bores.

I claim:

1. A hydropneumatic oleo strut and the like adapted to be arranged between a wheel supporting means and a vehicle body, comprising a cylinder, a head for the cylinder, a piston slidable in the cylinder and a level regulating means located within said head, said level regulating means comprising a control piston slidable in a bore provided in said cylinder head, said cylinder head having passages leading to a pressure line and drain line respectively with said passages communicating with said bore, said control piston having opposite ends with the end remote from the cylinder extending into an enlarged space of said bore in said cylinder head, the opposite end of said control piston extending into a piston space defined in said cylinder between the head of the piston and said cylinder head, said control piston having means constituting a flow path therein between said pressure passage and the end of the control piston remote from the piston space, said end of the control piston extending into said piston space having means together with said cylinder head constituting a hermetic seal opening in the direction of the piston space, said control piston having a flow path therein providing communication between said pressure passage and said piston space, said level regulating means dependent upon the relative position of the piston rod and cylinder establishing in a first position a flow connection between the pressure passage and said piston space, in a second position a flow connection between said piston space and said drain passage and a neutral position blocking said flow connections, a continuously operative spring means related to said control piston serving to move said control piston into a position corresponding to said first control position and an extension spring connected to the end of the control piston extending into said piston space and to said piston operative only within a certain stroke range for moving said control piston into said second regulating position against the force of said continuously operative spring.

2. The hydropneumatic oleo strut and the like as claimed in claim 1 in which said flow path between said pressure passage and said piston space includes an annular groove in the control piston adjacent said sealing surface, a transverse bore connecting said annular groove with an axial bore in the control piston with the end of the control piston remote from said piston space, and said control piston having at least one additional annular groove spaced from said mentioned annular groove which additional annular groove dependent upon the position of the control piston is connected either with the pressure passage, the drain passage or separated from both such passages and transverse bores connecting said additional annular groove with the axial bore of the control piston.

UNITED STATES PATENT OFFICE
CERTIFICATE OF CORRECTION

Patent No. 3,572,679           Dated March 7, 1971

Inventor(s)  Günther S T R A U F F

It is certified that error appears in the above-identified patent and that said Letters Patent are hereby corrected as shown below:

Correct the spelling of inventor's first name to read
-- Günther --.

Signed and sealed this 3rd day of July 1973.

(SEAL)
Attest:

EDWARD M. FLETCHER, JR.                Rene Tegtmeyer
Attesting Officer                      Acting Commissioner of Pa